United States Patent [19]

Macksoud

[11] Patent Number: 4,614,140

[45] Date of Patent: Sep. 30, 1986

[54] SAFETY DEVICE FOR ROCKING ARM SAW

[76] Inventor: Albert A. Macksoud, R.R.#1, Leamington, Province of Ontario, Canada, N8H 3V4

[21] Appl. No.: 615,608

[22] Filed: May 31, 1984

[51] Int. Cl.[4] .......................... B23D 45/04; B27B 5/20

[52] U.S. Cl. .......................................... 83/397; 83/544; 83/477.1; 83/477.2; 83/478; 83/483

[58] Field of Search ..................... 83/490, 471.2, 477.1, 83/477.2, 478, 471.3, 440 R, 860, 544, 545, 546, 397, 483, 574

[56] References Cited

U.S. PATENT DOCUMENTS

| | | | |
|---|---|---|---|
| 1,640,517 | 8/1927 | Procknow | 83/478 |
| 1,647,868 | 11/1927 | Johnson | 83/478 |
| 1,720,535 | 7/1929 | Wold | 83/478 |
| 2,095,330 | 10/1939 | Hedgpeth | 83/478 |
| 3,105,530 | 10/1963 | Peterson | 83/478 |
| 3,808,932 | 5/1974 | Russel | 83/478 |
| 4,276,799 | 7/1981 | Muehling | 83/477.2 |
| 4,336,733 | 6/1982 | Macksoud | 83/477.2 |

FOREIGN PATENT DOCUMENTS

| | | | |
|---|---|---|---|
| 974463 | 2/1951 | France | 83/478 |

*Primary Examiner*—Frank T. Yost
*Assistant Examiner*—Hien H. Phan
*Attorney, Agent, or Firm*—Cullen, Sloman, Cantor, Grauer, Scott & Rutherford

[57] ABSTRACT

A safety device for a rocking arm saw includes a blade guard assembly which may be selectively mounted on a handle which rocks the saw blade for crosscutting operations or on a workpiece supporting surface for ripping operations. The blade guard assembly includes a guard housing substantially covering the portion of the blade which extends above the workpiece support surface and is pivotally mounted to the handle for displacing the blade by means of a first mounting arm. The blade guard is mounted on the workpiece support surface by a mounting arm having the opposite ends thereof respectively pivotally connected to the blade guard and a planar, upright support mounted on the supporting surface. The upright support is coplanar with the blade and posses a thickness no greater than that of the blade so as to pass through a cut produced by the blade when a workpiece is moved across the support surface and through the blade.

13 Claims, 9 Drawing Figures

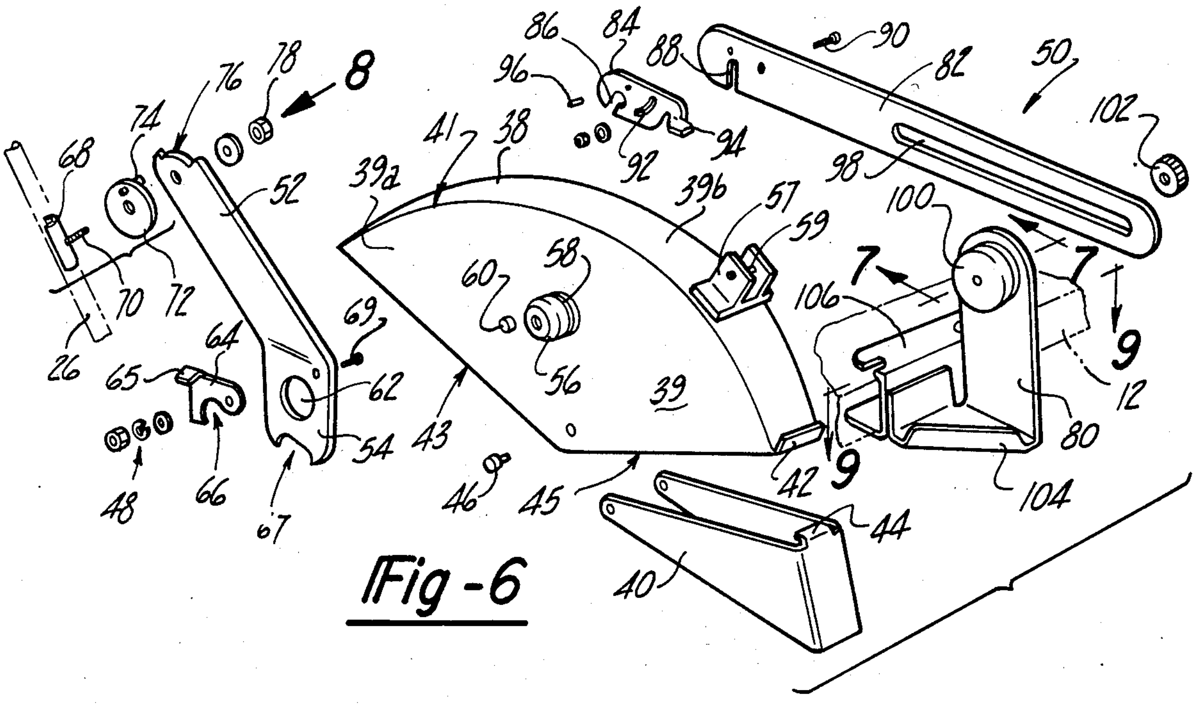
IFig-6
IFig-7
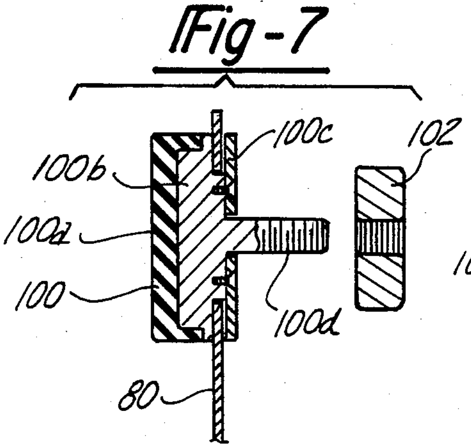
IFig-9
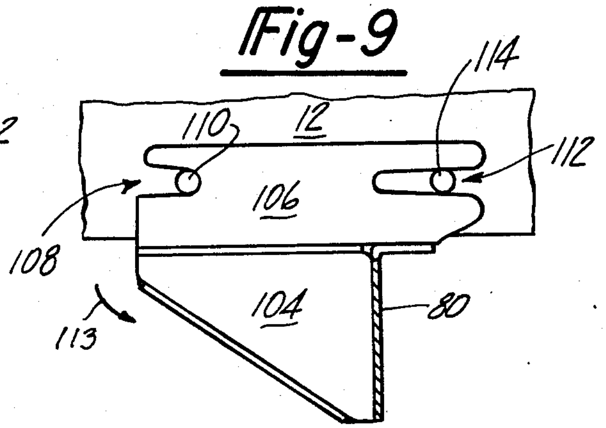
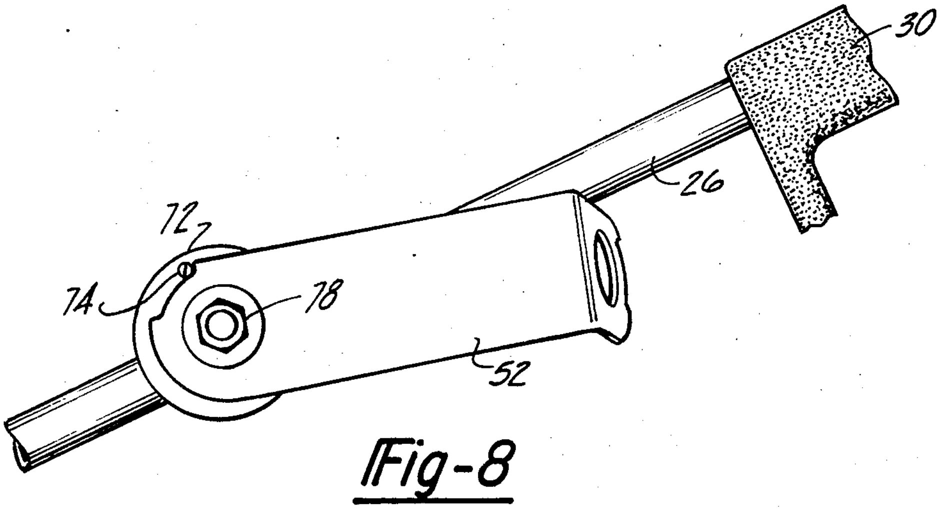
IFig-8

SAFETY DEVICE FOR ROCKING ARM SAW

TECHNICAL FIELD

The present invention broadly relates to safety devices for saws, particularly of the rocking arm type, and deals more particularly with a guard for protectively covering an exposed portion of the rocking arm-circular saw blade during both cross-cut and ripping operations.

BACKGROUND ART

Rocking arm circular saws are known in the art, as evidenced by U.S. Pat. No. 4,336,733 issued June 29, 1982, to Macksoud. The saw shown in this prior patent is of a bench or tabletop type construction which allows both cross cutting and ripping operations to be performed. The circular saw blade and associated driving motor therefor are both mounted on a rocking arm which is pivotally supported on the base of the saw, beneath a tabletop-like, horizontal surface which supports the workpiece to be cut. A generally U-shaped handle connected to the rocking arm assembly extends above the tabletop and provides the saw operator with a handle for rocking the saw blade from a lowered, retracted position beneath the tabletop to a raised cutting position in which at least a portion of the blade extends through a slot in the tabletop, above the tabletop surface.

Crosscutting operations are performed by maintaining the workpiece stationary on the tabletop and rocking the saw blade from its lowered retracted position to its raised cutting position, thereby pulling the blade through the workpiece to effect the cut. In order to perform ripping operations, the blade is rocked upwardly to a raised position at a desired cutting blade height and is locked in place, following which the handle is removed in order to eliminate it as an obstruction above the tabletop. The workpiece is then pushed across the tabletop and through the exposed portion of the saw blade in order to effect the cut.

Although the rocking arm saw described above is highly effective in operation and simple to use, the exposed portion of the saw blade above the tabletop presents some risk to the saw operator, even when caution is exercised. Heretofore, however, a safety device for guarding the saw blade has not been provided.

A number of problems must be dealt with in providing a saw blade guard for the type of rocking arm saw described above. For example, the blade guard must be effective in covering the blade during both crosscutting and ripping operations. During the crosscutting operation, however, the blade moves longitudinally along the path of the cut due to its rocking motion, thus it is necessary to provide a guard which tracks with the blade throughout its longitudinal displacement. Moreover, the guard should preferably allow retraction of the blade, even though the guard encounters an obstruction during the course of its return travel.

On the other hand, the guard must be mounted in a manner so as to cover the blade at all times during ripping operations but yet not present an obstruction to the path of travel of the workpiece and also not interfere when the saw is being employed in crosscutting operations. Additionally, for purposes of ripping operations, the guard must be positioned over the blade regardless of the longitudinal position of the blade which, as previously indicated, depends upon the blade cutting height that has been selected.

Each of the foregoing design problems must be dealt with while at the same time, consideration must be given to the ease and portability of the saw. The saw described in U.S. Pat. No. 4,336,733 mentioned above is lightweight, compact and may be quickly converted into a readily portable package, consequently it is necessary that the safety device for the blade be compatible with the portability of the saw and the ease with which it may be set up and taken down.

It is thus a primary object of the present invention to provide a safety device for a rocking arm saw which satisfies each of the requirements mentioned above.

Another object of the invention is to provide a safety device as mentioned above which is relatively simple, lightweight and easy to install.

Other objects will be made clear or will become apparent during the course of the following description of a preferred embodiment of the present invention.

SUMMARY OF THE INVENTION

According to the present invention, blade guard apparatus is provided for use with a saw of the type including a circular disc saw blade, a tabletop for supporting a workpiece to be sawn and including a slot therein through which a portion of the blade may extend above the tabletop, and means for mounting the blade for selective rocking movement between a retracted position below the tabletop and a cutting position above the table top. The mounting means includes a swingable handle extending above the tabletop for imparting rocking motion to the blade.

The blade guard apparatus includes a blade guard which substantially covers or overlies the portion of the blade which extends above the tabletop, first means for releasably mounting the blade guard on the handle during crosscutting of the workpiece, and, second means for releasably mounting the blade guard on the tabletop during ripping operations. The first mounting means includes an arm, means for securing one end of the arm on the handle and means for pivotally connecting the other end of the arm with the blade guard in order to allow swinging movement of the blade guard relative to the handle. A releasable connection between the other end of the arm and the blade guard permits the guard to be disconnected from the handle and reconnected with the second means for mounting the blade guard on the table.

The second mounting means comprises a support extending upwardly above the tabletop. The support includes a planar portion extending coplanar with the blade and has a thickness not greater than that of the blade so as to pass through the cut made in the workpiece as the workpiece is pushed through the blade during ripping operations. An elongate connecting arm pivotally connecting the blade guard with the upper end of the planar, upright support extends forwardly of the upright support and mounts the blade guard for pivotal movement about two axes so as to cover the blade at all times. An elongate slot in the connecting arm allows adjustment of the length of the arm to alter the position of the blade guard so as to cover the blade regardless of the longitudinal position of the blade. The second mounting means consisting of the upright, planar support and the connecting arm may remain on the tabletop without interfering with crosscutting operations, but may be easily removed to permit breakdown and transport of the saw.

BRIEF DESCRIPTION OF THE DRAWINGS

In the drawings, which form and integral part of the specification and are to be read in conjunction therewith, and in which like reference numerals are employed to designate identical components in the various views:

FIG. 6 is a perspective, exploded view of the safety device which form the preferred embodiment of the present invention;

FIG. 7 is a sectional view taken along the line 7—7 in FIG. 6;

FIG. 8 is a side elevational view of the pivotal connection between the rocking arm control handle and the blade guard connecting arm with the arm shown in a folded storage position; and FIG. 9 is a sectional view taken along the line 9—9 in FIG. 6.

DESCRIPTION OF THE PREFERRED EMBODIMENT

Figure 1:
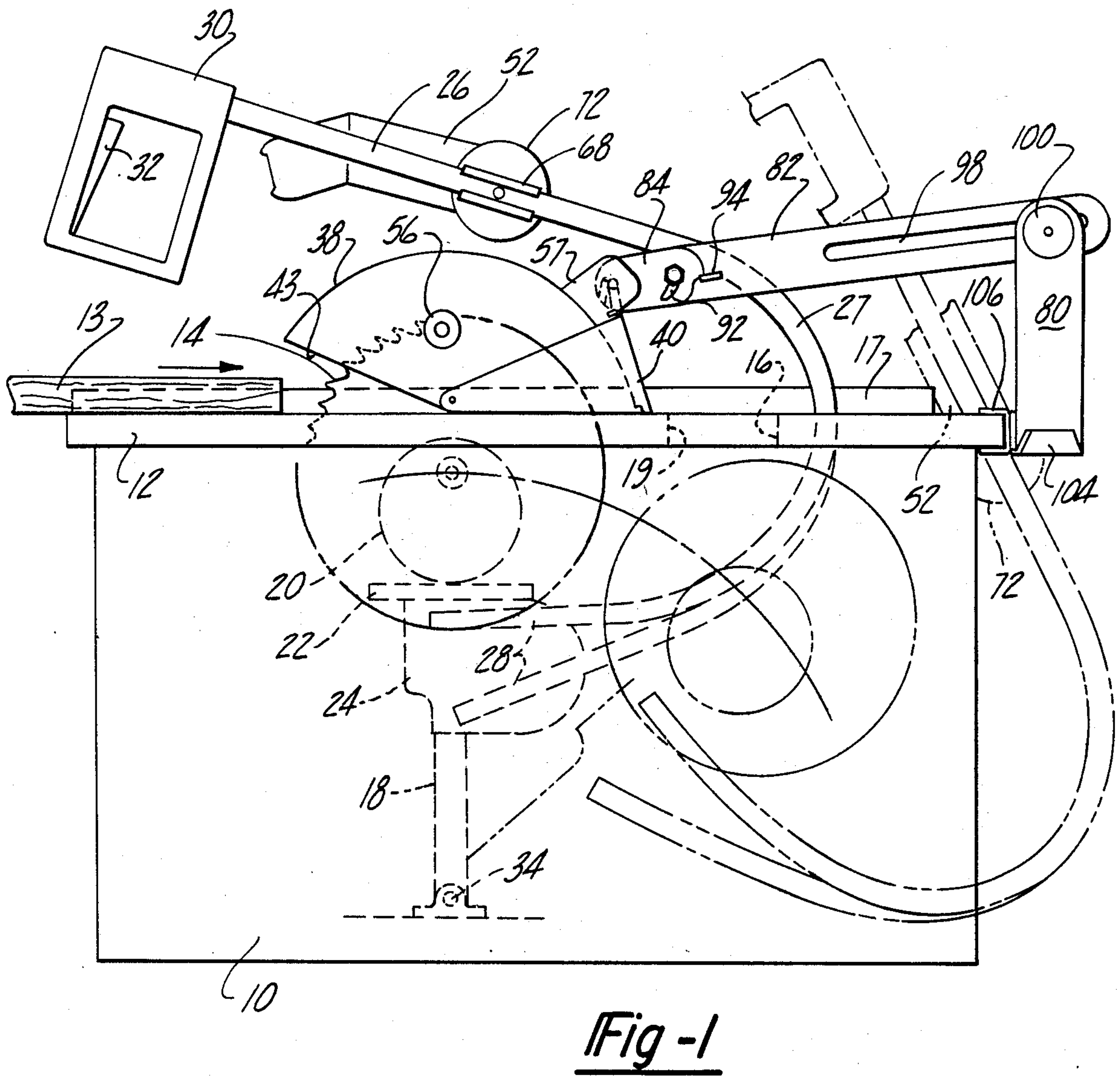
FIG. 1 is a side elevational view of a rocking arm saw employing the safety device of the present invention, the blade guard apparatus being configured for ripping operations, but prior to removal of the control handle.
Figure 2:
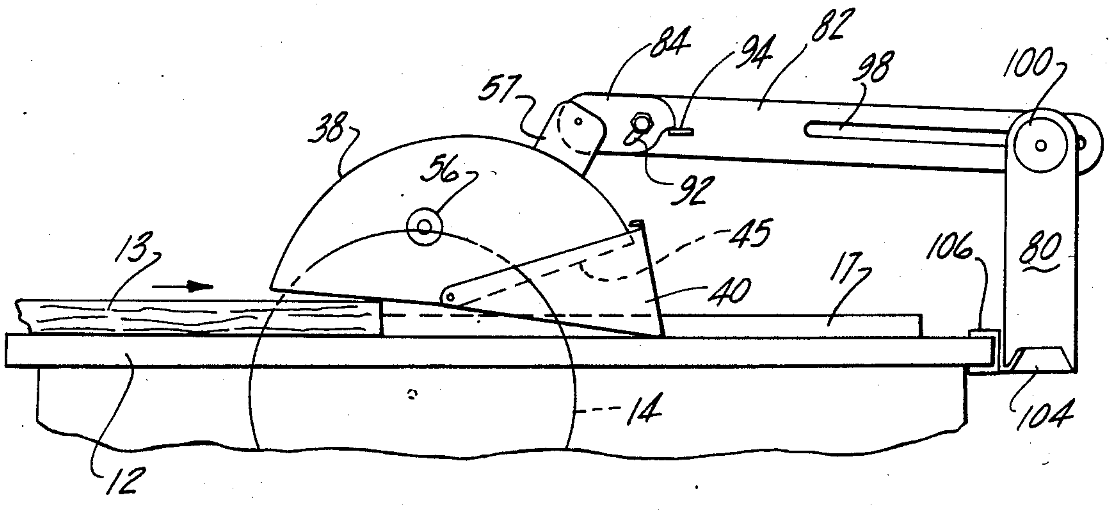
FIG. 2 is a fragmentary view, similar to FIG. 1, of the upper portion of the saw, with the control handle having been removed and the workpiece partially advanced into the saw blade.
Figure 5:
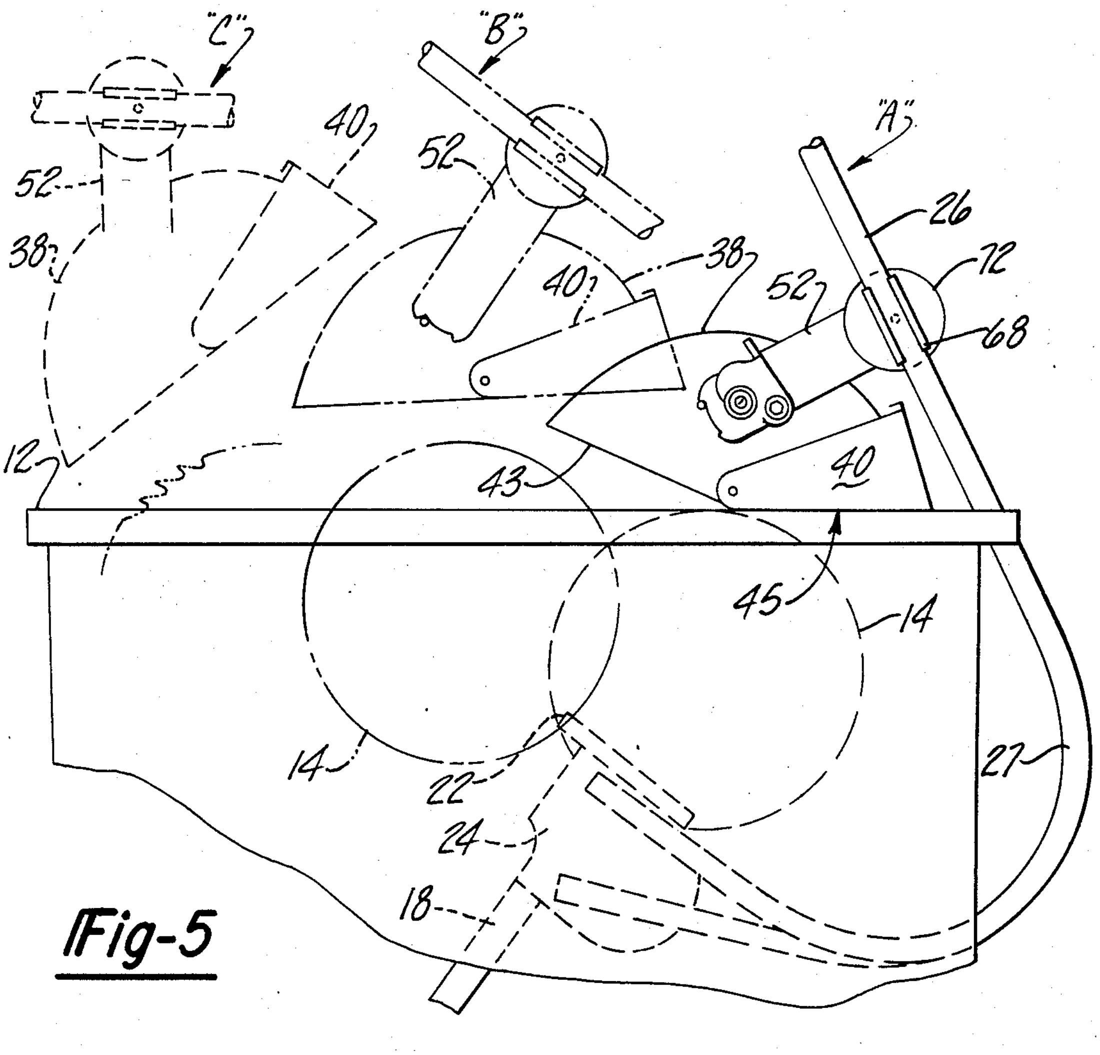
FIG. 5 is a fragmentary view of the upper portion of the rocking arm saw, but depicting the blade guard assembly configured for crosscutting operations, progressive positions of the handle and blade guard during a typical crosscut being indicated in the phantom.

Referring first to FIGS. 1 and 5 of the drawings, the present invention involves a safety device for use with a rocking arm saw having a base 10 upon which there is mounted a horizontal support surface or tabletop 12 for supporting a workpiece 13 to be sawn. The tabletop 12 includes an elongate slot 16 therein through which a portion of a circular disc saw blade 14 may extend for cutting the workpiece 13.

The saw blade 14 along with a driving motor 20 which rotates the blade 14 are mounted on a plate 22 which is in turn supported on a swingable rocker arm 18. The lower end of rocker arm 18 is pivotally mounted on the base 10 by means of a bearing 34. A handle plate 24 secured to the rocker arm 18 provides a means of mounting the lower extremities 28 of a saw blade control handle 26 on the rocker arm 18. Handle 26 is generally U-shaped and includes an upper portion 27 which extends upwardly through a second slot 19 in the tabletop 12 which is tranversely spaced from the saw blade slot 16 such that the handle 26 and saw blade 14 are transversely offset from each other. The upper portion 27 of the handle 26 extends forwardly and terminates in a grip 30 provided with a trigger 32 for selectively energizing the saw blade motor 20. The entire assembly of the saw blade 14, motor 20, mounting plate 22, handle plate 24, rocker arm 18 and handle 26 are swingable about a pivot point defined by the bearing 34.

As best seen in FIG. 1, the blade 14 is swingable from a retracted, standby position (indicated in the phantom in FIG. 1) beneath the tabletop 12 to a raised cutting position in which at least a portion of the blade 14 extends above the upper surface of the tabletop 12. As described in U.S. Pat. No. 4,336,733, the handle plate 24 is removably secured to the rocker arm 18 so as to permit removal of the handle 26 to allow rip sawing of a workpiece 13. Similarly, conventional means (not shown) are provided for selectively locking the rocker arm 18 in a fixed position with the blade 14 at a desired cutting height during ripping operations.

The safety device of the present invention comprises a saw blade guard assembly 36 (FIG. 6) for protectively covering the exposed upper portion of the saw blade 14 in order to reduce the risk of injury to the saw operator. The blade guard assembly 36 broadly comprises a blade guard shroud or housing 38, first means 48 for releasably mounting the housing 38 on the handle 26 and second means broadly indicated at 50 for releasably mounting the guard 38 on the tabletop 12. The guard 38 may be mounted on the handle 26 to perform crosscutting operations or may be mounted on the tabletop 12 in order to perform ripping operations. As best seen in FIG. 6, the guard 38 includes a main pie-shaped body 39 formed of metal or the like. Body 39 is defined by a pair of side walls 39*a* having arcuate edges 41 connected by an end wall 39*b*. The lower extremities of the side walls 39*a* terminate in straight, leading and trailing edges 43 and 45 respectively. Guard 38 further includes a pivotal segment 40 which is pivotally mounted on the main body 39 by means of a pivot pin 46 and normally covers the trailing edge 45 of the body 39. The pivotal segment 40 possess a diameter slightly greater than that of the main body 39 and includes a stop 44 which is engagable with a tab 42 on the main body 39 to limit downward pivotal movement of section 40. A bifurcated mounting bracket 57 provided with a pivot pin 59 allows mounting of the guard 38 on the tabletop 12 using the second mounting means 50. A bearing 56 secured to one side wall of the main section 39 allows the guard 38 to be mounted on the handle 26 by the first mounting means 48.

Attention is now particularly directed to FIGS. 5, 6 and 8 wherein the details of the first mounting means are depicted. The first mounting means 48 includes an elongate, angled connecting arm 52 having a lower portion 54 which includes an aperture 62 adapted to receive the bearing 56 therethrough. The lower portion 54 of arm 52 has pivotally mounted thereon by means of a nut and screw assembly 69, a latching lever 64. Latching lever 64 includes a flat, arcuate edge 66 which is receivable within a circumferential groove 58 in the bearing 56. A finger tab 65 allows the latch 64 to be gripped and pivoted into and out of the groove 58. The arcuate edge 66 of latch 64 slidably engages the bearing 56 within the groove 58 to allow pivoting of the guard 38 on the lower portion 54 of arm 52. The bottom edge of the lower portion 54 of arm 52 is provided with a cutout 67 therein defining a pair of stop surfaces at the opposite ends of the cutout 67 which are engagable by a pin 60 secured to the side wall of the guard 38 in order to limit the extent of pivotal movement of the guard 38 relative to the arm 52.

The upper end of the arm 52 angles transversely away from the guard 38 toward the handle 26. The upper end of arm 52 is pivotally mounted to the handle 26 by means of a sleeve-like mounting bracket 68 secured as by welding to the handle 26, a screw 70 which extends transversely through the bracket 68 and an apertured mounting plate 72 which is secured as by welding to the bracket 68. Plate 72 includes a central aperture through which the screw 70 extends. The upper end of arm 52 includes an aperture through which the machine screw 70 extends and is retained on the mounting plate 72 by means of a nut 78. Mounting plate 72 provides a substantially flat mounting face for engaging and stabilizing arm 52. A pin 74 extending through the mounting plate 72 is received within a cutout 76 at the upper end of the arm 52. The surfaces at opposite ends of the cutout 76 define stops which are engagable with the pin 74 in order to limit the pivotal movement of the upper end of arm 52 relative to the handle 26.

It may thus be appreciated that the arm 52 is pivotable about its upper end relative to the handle 26 within the limits defined by the stop surfaces of the cutout 76 to allow folding of the arm 52, and the guard 38 is likewise pivotable relative to the lower portion 54 of the arm 52 within the limits dictated by the stop surfaces defined by the cutout 67 for reasons discussed hereinbelow. For reasons which will also become later apparent, the length of the arm 52 is preferably choosen such that the guard 38 remains spaced above the blade 14 at all times during crosscutting operations, although it is recognized that a longer arm may be employed in order that a portion of the blade 14 is received within the guard 38.

In order to mount the guard 38 on the handle 26, the latch 64 is pivoted into clearing relationship to the aperture 62 and the bearing 56 is inserted through the aperture 62. Latch 64 is then pivoted into a locking position with the arcuate locking edge 66 being received within the groove 58, thus locking the guard 38 on the arm 52. At this point, the blade guard assembly 36 is configured to allow crosscutting of the workpiece 13.

As shown in FIG. 5, with the handle 26 in position "A" and the blade 14 in its retracted position, the pivotable section 40 of the guard 38 is collapsed; the trailing edge 45 rests flushly on the tabletop 12 and the leading edge 43 of the guard 38 is elevated above the tabletop 12 a sufficient distance to clear the workpiece 13. As the handle 26 is pulled forwardly causing the blade 14 to move forwardly and up through the tabletop 12 into cutting relationship with the workpiece 13, the guard 38 moves upwardly and pivots forwardly (counterclockwise as viewed in FIG. 5) about bearing 56 to overlie and thereby cover the leading edge of the blade 14, and the pivotal section 40 moves downwardly to cover the rear edge of the blade 14. The connecting arm 52 normally remains stationary relative to the handle 26 during displacement of the handle 26 by virtue of the pin 74 being in engagement with one extremity of the cutout 76. As the handle 26 is moved forwardly from position "A" to "B", the leading edge 43 of the guard 38 pivots forwardly and downwardly in order to continue covering blade 14, and the pivotal section 40 moves forwardly and downwardly to cover the rear portion of the blade 14. Continued displacement of handle 26 from position "B" to position "C" results in the guard 38 further pivoted forwardly, thereby assuring that the blade 14 remains substantially covered. Return of the handle 26 from position from "C" to position "A" results in movement of the blade guard 38 in the reverse order of that described above.

In the event that the guard 38 encounters an obstacle during the retraction stroke of the blade 14, the handle 26 and blade may continue to retract while the obstructed guard pivots about either or both the upper and lower end of the arm 52.

Although the guard 38 remains spaced above the blade 14, it may be appreciated that the guard 38 overlies the blade 14 at all times and prevents objects, including the operator's hands, from falling on the blade 14. The spacing of the guard 38 above the blade 14 and tabletop 12 serves the following important safety function. The edge of an elongate workpiece adjacent the blade 14 may swing upwardly after the sawing operation is completed in those cases where the other end of the workpiece extends outwardly beyond the tabletop 12. The vertical clearance between the tabletop 12 and the bottom edge of the guard 38 allows the workpiece edge to clear the guard as the workpiece swings upwardly, thus avoiding possible damage to the guard 38 and associated mounting means 48.

As will be later described, the blade guard 38 is disconnected from the arm 52 for ripping operations simply by releasing the latch 64 and removing the guard 38 from the arm 52. For storage purposes, the arm 52 may then be pivoted about mounting plate 72 to the storage position shown in FIG. 8.

Attention is now particularly directed to FIGS. 1, 2, 3, 4, 6, 7 and 9, wherein the details of the second mounting means 50 are best depicted. The second mounting means 50 includes a planar, upright support 80 which extends upwardly above the surface of tabletop 12 and is coplanar with and spaced rearward from the blade 14. The upright support 80 possess a thickness no greater than that of the blade 14 so as to pass through a cut 19 (FIG. 4) in the workpiece 13 produced by the blade 14. The upright support 80 is mounted along the rear edge of the table 12 by means of a base 104 secured as by welding to a U-shaped mounting bracket 106 which engages three contiguous edges of the tabletop 12. As shown in FIG. 9, the upper face of the bracket 106 includes a pair of opposing slots 108, 112 which are of unequal length for respectively receiving therein mounting pins 110, 114 secured to and extending upwardly from the upper surface of the tabletop 12. In the normal operating position of the bracket 106, pin 110 is positioned at the inner end of slot 108 and pin 114 is positioned intermediate the ends of slot 112.

The blade guard 38 is pivotally mounted on the upper end of the upright support 80 by means of an elongate connecting arm 82. The forward end of arm 82 is provided with a slot 88 for receiving the pivot pin 59 therein. A latch member 84 includes a cutout 86 which cooperates with slot 88 to capture the pivot pin 59, thereby pivotally mounting the blade guard 38 on the forward end of the arm 82. The latch 84 is pivotally mounted on the arm 82 by means of a pivot pin 96, and a machine screw assembly 90 extending through the arm 82 and a slot 92 in the latch 84 adjusts the tension required to pivot the latch member 84. A finger tab 94 provides a convenient means of applying pivotal pressure to latch member 84.

The rear end of arm 82 is pivotally mounted on the upper end of support 80 by means of a bearing assembly 100 which includes a hub **100*b* having an outer face formed preferably of rubber 100*a*. The hub 100*b* includes a threaded shaft 100*d* which extends through an aperture in the support 80. A circular retainer plate 100c is secured to the hub 100*b* so as to retain and freely pivotally mount the hub 100 on the support 80. The arm 82 includes longitudinally extending, elongate slot 98** therein. The threaded shaft 100*d* extends transversely through the slot 98 such that the arm 82 is captured between the retainer plate 100*c* and a threaded locking knob 102 received on the shaft 100*d*. Tightening of locking knob 102 draws the arm 82 tightly against the retaining plate 100*c* thus preventing longitudinal movement of the arm 82 relative to the support 80. However, arm 82 remains freely pivotable about the upper end of the support 80 by virtue of the free pivotal mounting of the hub 100 on the upright support 80.

In order to perform ripping operations, the blade guard 38 is positioned beneath the arm 82 and the pivot pin 59 is inserted through the aligned opening presented by the cutout 86 and the slot 88. The latch 84 is then pivoted from an open position to a locking position thereby pivotally mounting the guard 38 on the forward end of the arm 82. The rocking arm 18 having been locked in position such that the blade 14 is at a desired cutting height, it is then necessary to longitudinally position the blade guard 38 above the blade 14. This is accomplished by loosening the locking knob 102 and sliding the assembly of the arm 82 and guard 38 until the guard 38 is substantially positioned above the fixed position of the blade 14. The locking knob 102 is then tightened to fix the longitudinal position of the blade guard 38.

Figure 3:
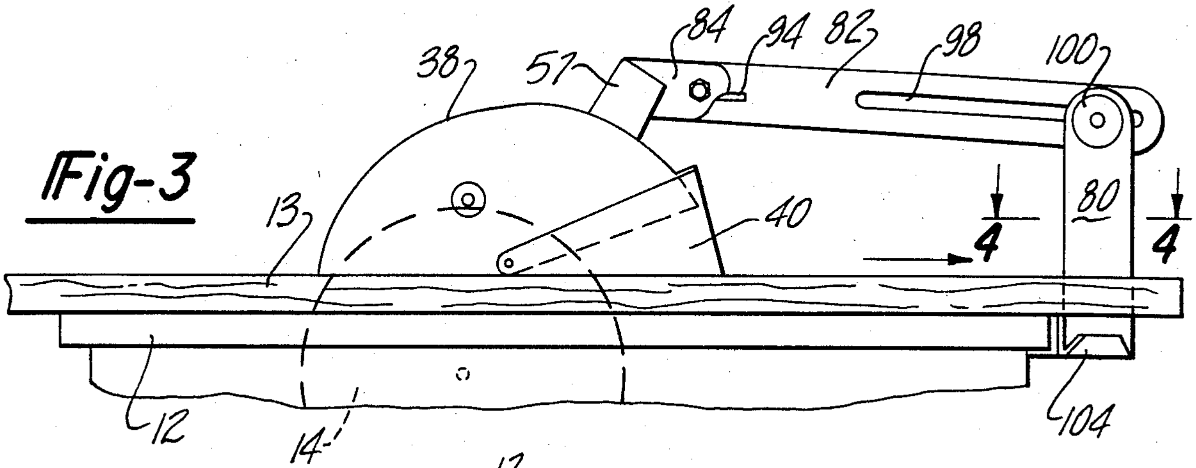
FIG. 3 is a fragmentary view similar to FIG. 2 but showing the workpiece farther advanced through the saw blade.
Figure 4:
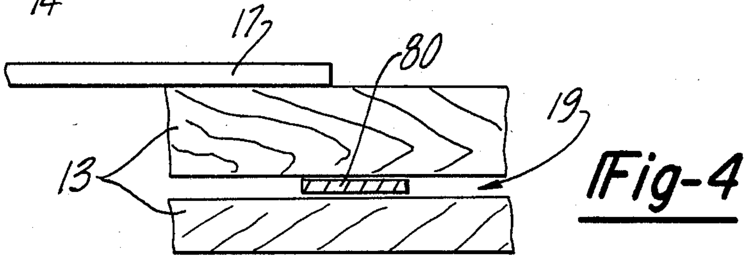
FIG. 4 is a sectional view taken along the line 4—4 in FIG. 3.

As best seen in FIG. 1, the workpiece 13 is guided toward the blade 14 with the aid of a conventional ripping fence 17. The trailing edge 45 of the blade guard 38 rests on the tabletop 12, with the leading edge 43 thereof slightly elevated to received the workpiece 13 therebeneath. As the forward edge of the workpiece 13 engages the leading edge 43 of the guard 38, the blade guard 38 and the arm 82 move upwardly, causing the guard 38 to pivot relative to the arm 82 while the rear end of the arm 82 likewise pivots about the upper end of the support 80. Forward pivoting of the guard 38 causes the leading edge 43 of the guard 38 to cover the leading edge of the blade 14. The guard 38 continues to pivot counterclockwise as shown in FIG. 1 until the leading edge 43 flushly engages the workpiece 13, as shown in FIG. 3; at this point, the pivotal section 40 of the guard 38 has moved downwardly to cover the rear edge of the blade 14. As previously mentioned, the thickness of the support 80 is no greater than that of the blade 14, consequently the support 80 passes through the cut 19 in the workpiece 13, thus permitting passage of the workpiece. After the workpiece 13 clears the blade 14, gravity draws the guard 38 and arm 82 downwardly, so as to continue protectively covering the blade 14.

When it is desired to change over from ripping to crosscutting, the blade guard 38 is released from arm 82 by unlatching the pivot pin 59 and the guard 38 is then reattached to arm 52 associated with the handle 26 as previously described. Locking knob 102 is then loosened and the arm 82 is slid to its rearmost position and is locked in place with locking knob 102. It is to be understood, however, that it is not necessary to remove the upright support 80 from the tabletop 12 since, with the arm 82 fully retracted, neither the arm 82 nor the upright support 80 present any obstruction which would impede cross-cut operations.

From the foregoing, it may be appreciated that the blade guard 38 may be easily and rapidly connected to either the handle 26 for crosscutting or to the upright support 80 for ripping using a minimum of mounting structure. The blade guard assembly 36 is also well suited for portable rocking arm saws, such as that disclosed in U.S. Pat. No. 4,336,733, the components of which readily breakdown for storage and transport. For example, in order to breakdown the saw for storage or transport, the blade guard 38 is removed from either the mounting means 48, 50. The mounting arm 52 is then swung to a folded, storage position, and the entire second mounting means 50 is removed from the tabletop 12 by sliding the bracket 106 transversely toward the right as viewed in FIG. 9, until clearance with pin 110 is acheived following which the bracket 106 may be removed by pivoting the bracket 106 in the direction of arrow 113 about pin 114 and withdrawing it from the edge of the tabletop 12.

In view of the above, it is apparent that the safety device for the rocking arm saw described above not only provides for the reliable accomplishment of the objects of the invention, but does so in a particularly safe, effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject manner claimed and all equivalents thereof fairly within the scope of the invention.

I claim:

1. Blade guard apparatus for use with a portable saw adaptable for use as both a pull-through rocker arm saw with a handle extending above its tabletop for rocking a circular disc blade from a concealed position below the table top to a partially exposed cutting position above the tabletop, and as a table saw with a plurality of exposed longitudinal positions within a long slot in the tabletop for depth of cut adjustment, said slot extending in the direction from a front edge of the tabletop toward a rear edge of the tabletop; comprising:
   - a blade guard for substantially protectively covering the exposed portion of said circular saw blade,
   - means fastened to a portion of said handle which extends above said tabletop for securing a connecting arm for releasably connecting said blade to said handle,
   - said connecting arm allowing said handle to lift and rock said blade guard over said rocking saw blade by said handle for normally covering the exposed portion of said saw blade during the cross-cutting operation of said saw,
   - securing means fastened in a recess in the surface of said tabletop at the rear edge thereof behind the saw blade slot for releasably securing an upright support on said tabletop,
   - said upright support being oriented and dimensioned so that the portion which extends above the table top is confined to the line of cut of said saw blade, said upright support having means for pivotally and slidably supporting a bar for mounting said blade guard on said upright support, and
   - said blade guard being releasably mountable on said mounting bar for covering the exposed portion of said saw blade in any of said plurality of positions within said tabletop slot during the rip-cutting operations of said saw.

2. The blade guard apparatus of claim 1, wherein said blade guard includes a body of a sectorial shape defined by a pair of side walls each having an arcuate edge and straight leading and trailing edges substantially equal in length and diverging at an angle of between about 140° and 160° from an intersection point located near a center point from which said arcuate edges are generated, said arcuate edges being interconnected by an end wall, said blade guard setting on said trailing edges during stand-by positions for both cross-cutting and rip-cutting operations of the saw, and said blade guard setting on said leading edges over the workpiece while the workpiece advances through the saw blade during the rip-cutting operations of the saw.

3. The blade guard apparatus of claim 2, including a bifurcated bracket fastened on the end wall of said blade guard between the center and the rear end having a cross-center pin for pivotally releasably connecting said blade guard with said mounting bar, in a quick connecting and releasing manner, for rip-cutting operations of said saw.

4. The blade guard apparatus of claim 2, including a trailing edges extension shaped as a segment of said blade guard body and pivotally mounted on said blade guard body at said center point of said arcuate edges, said extension possessing a diameter slightly bigger than that of said blade guard body and surrounding the trailing edges of said blade guard body for extending said trailing edges downwardly when said blade guard is lifted by the handle normally during the cross-cutting operations of said saw for protecting a person operating the saw from debris flying from said rotating saw blade, and for extending said elevated trailing edges downwardly when said blade guard is tipped on the leading edges normally during the rip-cutting operations of said saw for protecting such person from flying debris emitted from said rotating saw blade, and cooperating stop means on said blade guard body and on said extension for limiting the relative pivotal movement therebetween to prevent said extension from separating from said blade guard body.

5. The blade guard apparatus of claim 1, including a generally cylindrical bearing fastened on said blade guard for pivotally releasably connecting said blade guard with said connecting arm, in a quick connecting and releasing manner, for covering the exposed portion of said saw blade in the cross-cutting operations of said saw, a peripheral slot in the cylindrical surface of said bearing selectively receiving a latch member asociated with said connecting arm for locking the connection of said blade guard with said arm, and a pin projecting from said blade guard close to said bearing, engagable with a cutout in said connecting arm for limiting the pivotal movement of said blade guard relative to said arm.

6. The blade guard apparatus of claim 1, wherein said fastening means includes a plate firmly fastened on the upper portion of said saw handle having a flat surface for pivotally fastening said connecting arm to said handle allowing said arm to pivot downwardly for a working position and to pivot upwardly for a folding position against said handle for portability and storage when said blade guard is disconnected from said arm, and a pin projecting from said surface engagable with a cutout in said arm for limiting downward pivotal movement of said arm relative to said handle.

7. The blade guard apparatus of claim 1, wherein said handle travels in a plane which is laterally offset from the plane of said circular disc blade, and wherein said arm is connected at a first end to said handle and at a second end to said blade guard, said connecting arm being angled adjacent said second end so that said second end is at an angle of 90° in respect to said tabletop.

8. The blade guard apparatus of claim 7, including an aperture in said second end of said arm adapted for receiving a bearing on said blade guard for pivotally releasably connecting said blade guard with said arm, a latch mounted on said second end of said arm for selectively locking the connection of said arm against said blade guard, and a cutout at said second end of said arm engagable with a pin on said blade guard for limiting the pivotal movement of said blade guard relative to said arm.

9. The blade guard apparatus of claim 7, including a cutout at said first end of said arm engageable with a pin on said fastening means for limiting downward movement of said arm.

10. The blade guard apparatus of claim 1, wherein said securing means for said upright support includes a pair of short pins having their upper ends in the plane of the surface of said tabletop for releasably securing said upright support on said tabletop.

11. The blade guard apparatus of claim 1, wherein said upright support includes a base portion adapted to be received in said tabletop recess so as not to project above said tabletop, said base portion including a pair of oppositely opening slots of an unequal length engagable with a pair of pins projecting upwardly from said tabletop recess for securing said upright support on said tabletop.

12. The blade guard apparatus of claim 1, wherein said pivotal and slidable connection between said upright support and said mounting bar comprises a shaft extending through an aperture in said upright support, said shaft having an outer knob and a hub in said aperture allowing said shaft to pivot freely therein, said shaft further having a retainer plate for retaining said hub in said aperture and maintaining free pivotal movement of said shaft therein, a longitudinal slot in said mounting bar for longitudinally sliding said bar upon said shaft, a threaded portion of said shaft engaging a threaded locking knob for locking said bar at a desired longitudinal position relatively to said upright support by clamping said bar between said retainer plate and said locking knob while the pivotal movement of said shaft and said bar relative to said upright support is kept free.

13. The blade guard apparatus of claim 1, wherein said mounting bar comprises an elongated bar extending between said blade guard disposed freely over said saw blade and said upright support for mounting said blade guard on said upright support, a longitudinal slot extending through most of the length of said bar and slidably and pivotally mounted upon said upright support for covering the exposed portion of said saw blade in any of a plurality of positions along said tabletop slot, a latch associated with said mounting bar and engagable with said blade guard for pivotally releasably connecting said blade guard with said bar.

* * * * *

UNITED STATES PATENT AND TRADEMARK OFFICE
CERTIFICATE OF CORRECTION

PATENT NO. : 4,614,140
DATED : September 30, 1986
INVENTOR(S) : Albert A. Macksoud It is certified that error appears in the above-identified patent and that said Letters Patent is hereby corrected as shown below:

Column 8, line 43, claim 1, after "blade" should read --guard--.

Signed and Sealed this

Twenty-fourth Day of February, 1987

*Attest:*

DONALD J. QUIGG

*Attesting Officer* *Commissioner of Patents and Trademarks*